United States Patent
Wass et al.

[11] Patent Number: 5,971,016
[45] Date of Patent: Oct. 26, 1999

[54] SUPER HIGH FLOW PRESSURE RELIEF VALVE

[75] Inventors: Lloyd G. Wass, Eagan; Russell G. Tretter, Pierz, both of Minn.

[73] Assignees: Mirada Research & Manufacturing, Inc.; Lloyd Wass, both of Ironton, Minn.

[21] Appl. No.: 08/966,236

[22] Filed: Nov. 7, 1997

Related U.S. Application Data

[60] Provisional application No. 60/030,727, Nov. 8, 1996.

[51] Int. Cl.⁶ .................................................. F16K 15/00
[52] U.S. Cl. ........................................... 137/541; 137/542
[58] Field of Search .................................... 137/541, 540, 137/542

[56] References Cited

U.S. PATENT DOCUMENTS

| | | | |
|---|---|---|---|
| 2,072,271 | 3/1937 | Meadows | 137/541 |
| 2,082,807 | 6/1937 | Miller | 137/541 |
| 2,834,374 | 5/1958 | Klinkenberg | 137/541 |
| 2,845,085 | 7/1958 | Robbins | 137/541 |
| 2,854,021 | 9/1958 | Baldwin, Jr. et al. | 137/541 |
| 3,008,485 | 11/1961 | Johnson et al. | 137/541 |
| 3,347,266 | 10/1967 | Hansen | 137/540 |
| 3,590,851 | 7/1971 | Bogossian et al. | 137/541 |
| 3,714,965 | 2/1973 | Bentley | 137/541 |
| 4,129,144 | 12/1978 | Andersson et al. | 137/541 |
| 4,129,145 | 12/1978 | Wynn | 137/541 |
| 4,142,549 | 3/1979 | Autry | 137/543.21 |
| 4,674,530 | 6/1987 | Bickford | 137/541 |
| 5,443,092 | 8/1995 | Farnsworth et al. | 137/541 |
| 5,735,504 | 4/1998 | Walters | 137/540 |

FOREIGN PATENT DOCUMENTS

| | | | |
|---|---|---|---|
| 193342 | 10/1919 | Canada | 137/541 |
| 1179894 | 5/1959 | France | 137/541 |
| 1278603 | 11/1961 | France | 137/541 |

*Primary Examiner*—Denise L. Ferensic
*Assistant Examiner*—Joanne Y. Kim
*Attorney, Agent, or Firm*—John M. Vasuta

[57] ABSTRACT

A pressure relief valve for use with inflatable devices such as life rafts and escape slides which provide significant improvement in exhaust flows while maintaining a highly desirable compact configuration, particularly as to the height dimension. The pressure relief valve including a poppet having a protected skirt thereon which is biased within a valve body to maintain pressure within the inflatable device unless a preselected maximum pressure is exceeded whereby the poppet releases and opens a fluid passage to exhaust ports. The protected skirt providing a more efficient and thus improved "pop action" which results in improved low pressure PRV performance.

38 Claims, 8 Drawing Sheets

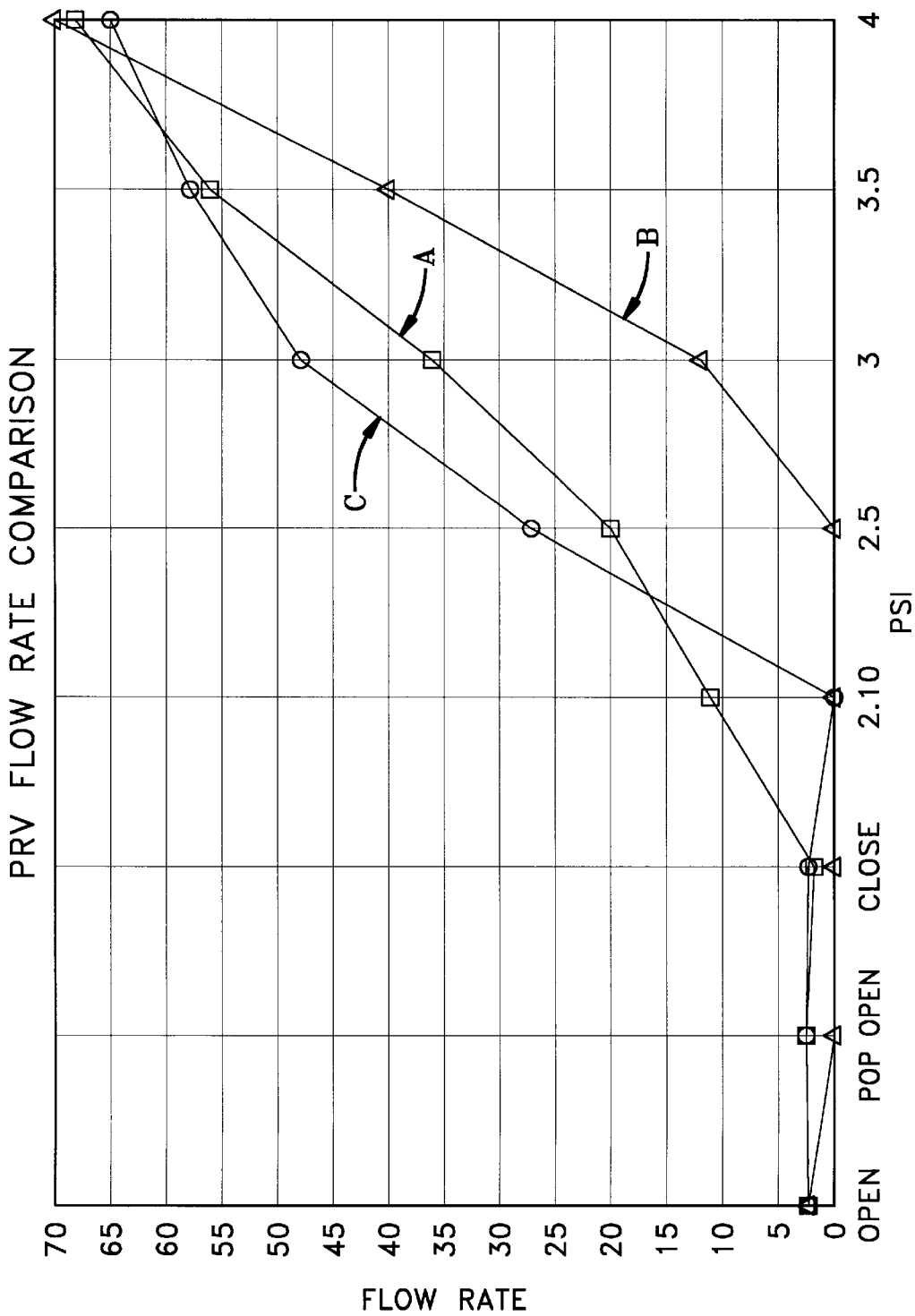

SUPER HIGH FLOW PRESSURE RELIEF VALVE

This application claims benefit of provisional application Ser. No. 60/030,727 filed Nov. 8, 1996.

BACKGROUND OF THE INVENTION

1. Technical Field

The invention relates to a valve for use in pressure relief applications. More particularly, the invention relates to a pressure relief valve for use with inflatable devices where the valve provides super high and efficient exhaust capabilities. Specifically, the invention is a low profile pressure relief valve of a "pop action" design for instantaneous over-pressure exhausting at very high flow rates where the poppet assembly further includes a protected skirt around the poppet seal for an enhanced "pop action" providing improved flow rates.

2. Background Information

In recent years, the use of and demand for inflatable devices has grown significantly. Inflatable devices are now commonly used by the military, shipping and airline industries in such specific applications as life rafts and escape slides.

It is highly recommended and often required that at least one pressure relief valve (PRV) be installed on these inflatable devices to provide for over-pressure exhausting. Occasionally, these inflatable devices are inflated to a pressure greater than the recommended maximum pressure for the particular inflatable device. Over-inflation, which may damage or burst the inflation device thereby subjecting the surrounding environment and persons to possible damage and injury, is prevented by this over-pressure exhausting. This release of the fluid contents returns the inflation device to a safe working pressure.

These pressure relief valves have been in use with inflation devices for many years. Generally, two different classes of these pressure relief valves are used by the inflatable device industry. The first class being an older or "conventional" PRV, often referred to as a low or medium flow PRV. These low/medium flow PRVs provide a gradual valve opening during exhausting. The second class of PRVs is the newer "pop action" PRV, often referred to as a high flow PRV. These high flow PRVs provide an initially gradual and partial opening followed by a "pop action" or rapid complete opening that permits rapid and high flow exhausting.

A common low/medium flow PRV is shown in FIGS. 6-7. These low/medium flow PRVs have a low profile design with a poppet assembly that is fully housed within the valve so as to be protected from external damage. These low/medium flow PRVs generally supply reasonable exhaust rates of approximately 10 to 20 cfm at pressures of 3.0 to 3.5 psi.

In many applications, significantly higher exhaust flow rates per valve are desirable in order to minimize the number of PRVs required to manage the potential over-pressure within an inflatable device. The invention of high flow PRVs met this demand. One type of high flow PRV, often referred to as a bonneted PRV, is shown in FIGS. 8-9. The bonneted PRV modified the low/medium flow PRV by redesigning the upper throat by adding a capped or a bonneted configuration which results in "pop action" over-pressure exhausting. This "pop action" significantly improved exhausting. The exhaust flows achieved by high flow PRVs were often as high as 40 cfm or more at pressures of approximately 3.5 psi.

However, the bonnet of the high flow PRVs extends above the valve body exposing the bonnet to damage from the external environment. A protective cage was thus added to the high flow PRVs to protect the poppet assembly. These protective cages and to a lesser degree these bonnets add undesirable height and bulk to the overall valve assembly. In response, internal poppet PRVs with "pop action" were developed such as the PRV shown in FIGS. 10-11 and described in more detail in U.S. Pat. No. 4,142,549.

These internal poppet PRVs as shown in FIGS. 10-11 were successful in maintaining the high exhaust flow expected of high flow PRVs while protecting the poppet assembly from damage. However, the industry continued to seek high flow capabilities coupled with the lowest feasible overall valve profile. In response, Mirada Research and Manufacturing in the mid-1980s reduced the height of these internal "pop action" PRVs by moving the spring in between the inflatable device and the poppet rather than extending outward from the poppet as shown in the '549 patent.

Although this Mirada™ High Flow PRV functions efficiently and provides a compact valve design that has generally been the industry standard for a decade or more, higher flow rates at reduced valve opening pressures continue to be a desirable objective. The reason for this objective is twofold.

First, the industry prefers valves with standard exhausting pressures of below 3.0 psi since this assures less stress on the raft or slide fabric, particularly on the seams thereof. The current designs typically offer either no flow or only low flow exhausting prior to reaching 2.5 to 3.0 psi. Therefore, although many of the current designs offer high flow, it is at a pressure of typically 3.0 to 4.0 psi, which is higher than preferred by the industry. As a result, the industry clamors for high flow at lower yet reliable exhausting pressures.

The importance of high flow coupled with lower and reliable exhausting pressures is especially critical whenever the raft or slide is to be used in a warm climate. The fluid supply for the raft or slide is filled under conditions unrelated to and often dissimilar from actual use conditions. The actual volume of fluid in actual use conditions is directly correlated to temperature since volume, pressure and temperature of any fluid are all interrelated and defined. It is well-known that as the atmospheric temperature rises that the pressure or volume rises if the other is held constant. The result in the raft and slide industry is that the fluid supply in a warm climate, such as one exceeding 100° F., is always excessive thus requiring exhausting during and/or after inflation. This cannot be overcome by reducing the initial fluid supply because this supply would then be deficient when the raft or slide is deployed in a cold climate, such as in Canada where the temperatures may reach −40° F. or below. It is thus critical that rafts and slides both fully inflate at all temperatures including sub-zero and tropical temperatures and include relief mechanisms for allowing pressure relief at tropical temperatures.

Second, a sufficient increase in the flow rate directly decreases the quantity of PRVs needed on larger flotation devices which presently include multiple PRVs. This, of course, directly reduces raft or slide production costs as well as maintenance costs.

In response to these objectives, Mirada modified its "High Flow PRV" to include approximately twice as many ports (16 instead of the industry standard of 8) of approximately one-half of the standard diameter and arranged the ports in a unique double row, "lazy Z" or zig-zag pattern. This smaller diameter, 16-hole zig-zag pattern provided flow rate increases of approximately 15% to 20% in comparison to the previous designs as described above when tested with identical throat diameters under identical pressure conditions. As a result, this modified high flow PRV reduced the quantity of PRVs needed in a given inflation device and supplied improved flow rates at a lower operating range.

However, the additional ports add additional cost to each PRV because each port must be bored and deburred—both of which are time consuming and cost adding processes. In addition, the industry continues to seek increased exhaust flow rates at lower operating pressures. These lower pressures reduce the stress on the raft fabric seams. The higher exhaust flow rates reduce the quantity of PRVs needed to accomplish such relief. It also continues to be desirable to provide "pop action" exhausting at between 2.0 to 2.5/2.8 psi rather than at higher pressures.

SUMMARY OF THE INVENTION

Objectives of the present invention include providing an improved pressure relief valve.

A further objective of the present invention is providing a pressure relief valve capable of rapid over-pressure exhausting.

A further and related objective of the present invention is providing a pressure relief valve capable of high or super high over-pressure exhausting.

A further and related objective of the present invention is providing a pressure relief valve capable of enhancing over-pressure exhausting.

A further and related objective of the present invention is providing a pressure relief valve of a "pop action" or "snap action" design for more efficient over-pressure exhausting with high exhaust flow rates.

A further and related objective of the present invention is providing a pressure relief valve with an improved and critically defined "pop action".

A further and related objective of the present invention is providing a pressure relief valve having a poppet assembly that includes a skirt for critically defining "pop action".

A further objective of the present invention is providing a pressure relief valve capable of over-pressure exhausting at high exhaust flow rates prior to achieving internal raft or slide pressures of 3.0 psi, or preferably 2.8 psi, or most preferably 2.5 psi or less.

A further and related objective of the present invention is providing a pressure relief valve capable of over-pressure exhausting at high exhaust flow rates while maintaining internal raft or slide pressures between 2.0 and 3.0 psi, and preferably between 2.0 and 2.8 psi, and most preferably not to exceed 2.5 psi.

A further and related objective of the present invention is providing a pressure relief valve capable of opening and rapid stabilization during over-pressure exhausting, particularly at pressures below 3.0 psi while supplying high flow rates.

A further objective of the present invention is providing a compact pressure relief valve.

A further and related objective of the present invention is providing a reduced height pressure relief valve.

A further objective of the present invention is providing a pressure relief valve that protects critical poppet components.

A further objective of the present invention is providing a pressure relief valve of increased exhaust flow rates.

A further and related objective of the present invention is providing a pressure relief valve of increased exhaust flow rates at an operating pressure which is within acceptable industry standards.

A further objective of the present invention is providing a pressure relief valve which is easy and economical to manufacture.

A further objective of the present invention is providing all of the above objectives in the same pressure relief valve.

These objectives and advantages are obtained by the improved pressure relief valve of the present invention, the general nature of which may be stated as including a pressure relief valve for use in exhausting over-pressure in an inflatable device comprising a valve body, a poppet seal, a poppet, and a biasing source. The valve body has an open end with a passage extending inward therefrom. The valve body includes a plurality of exhaust ports radially extending from the passage. The valve body further including a poppet stop in between the open end and the plurality of exhaust ports. The poppet has a base with a threaded shaft extending therefrom where the base includes an inner surface with an outer edge including a skirt extending therefrom whereby the poppet seal seats against the inner surface inside of the skirt. The biasing source biases the poppet against the poppet stop.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

FIG. 12 is a graphical representation of flow rates of various high and super high pressure relief valves.

Similar numerals refer to similar parts throughout the drawings.

DESCRIPTION OF THE PREFERRED EMBODIMENT

Figure 1:
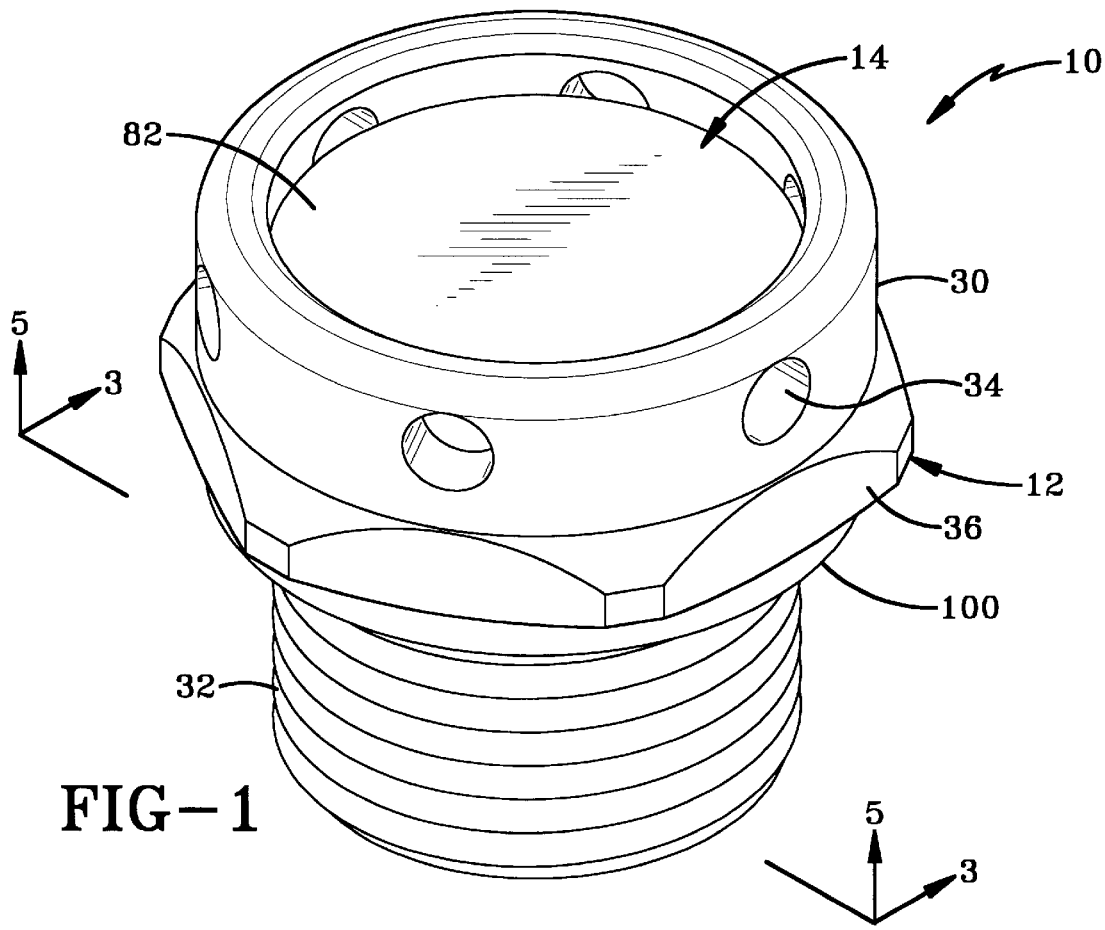
FIG. 1 is a perspective view of the super high flow pressure relief valve of the present invention.

The improved pressure relief valve, or PRV, for use in inflation devices such as life rafts and escape slides is indicated generally at 10, and is best shown in general in FIG. 1. Pressure relief valve 10 may be used with any type of inflatable device requiring rapid exhaustion of excess or surplus pressure when the inflation device is inflated beyond a predetermined maximum pressure limit.

Figure 2:
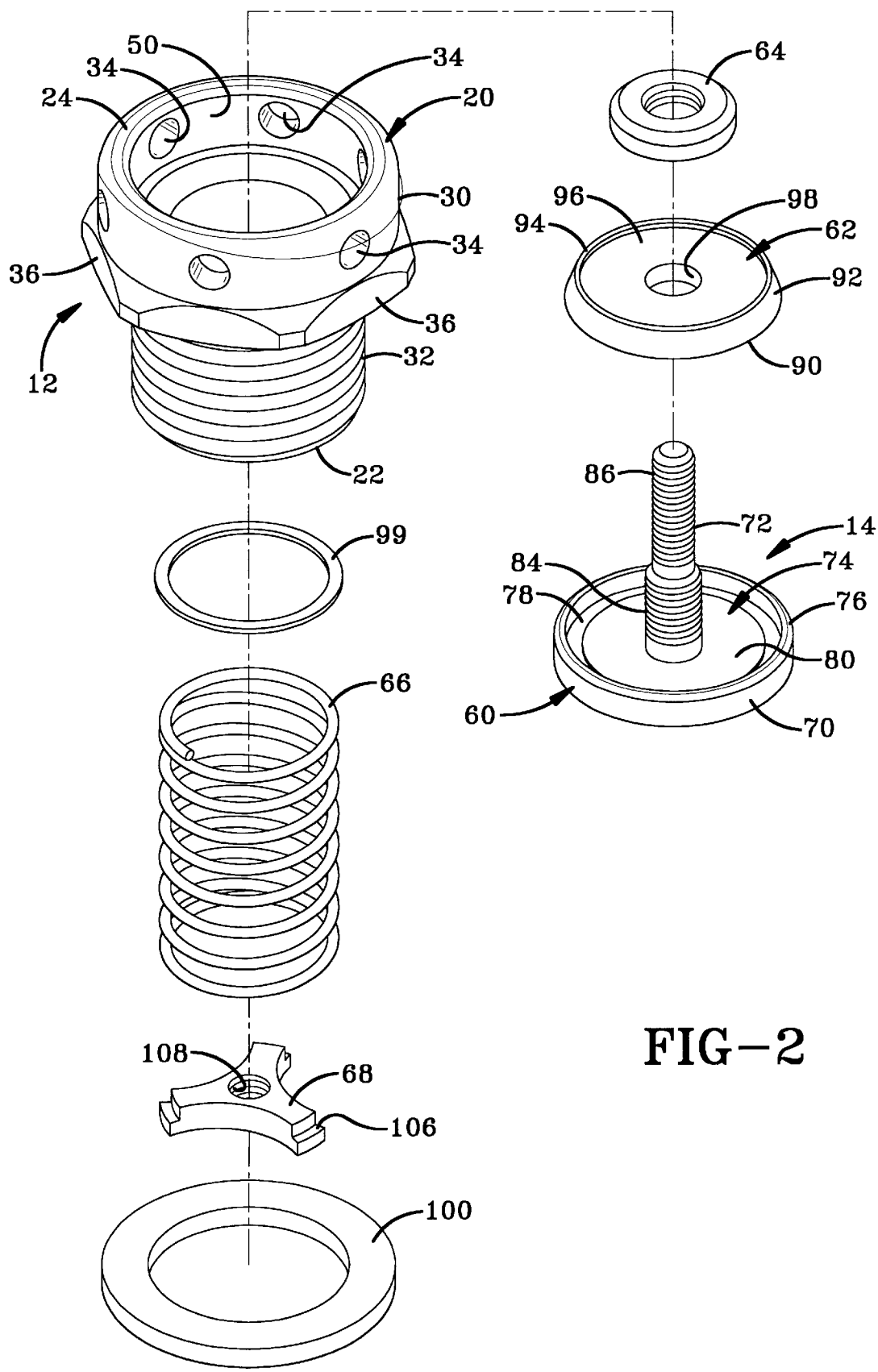
FIG. 2 is an exploded view of the super high flow pressure relief valve of FIG. 1.
Figure 3:
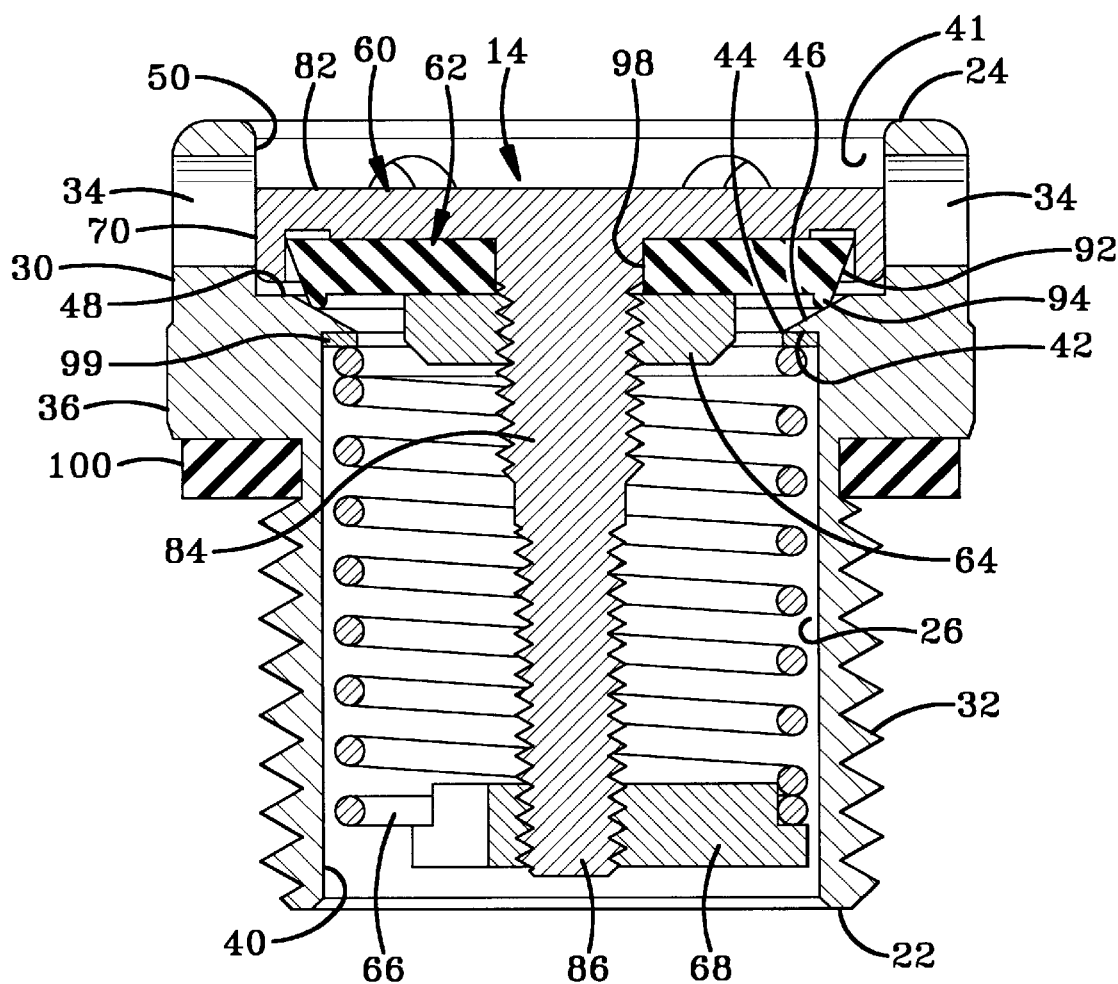
FIG. 3 is a sectional view taken along line 3—3, FIG. 1 showing the super high flow pressure relief valve attached to a properly pressurized inflation device where maximum pressurization has not been exceeded.
Figure 4:
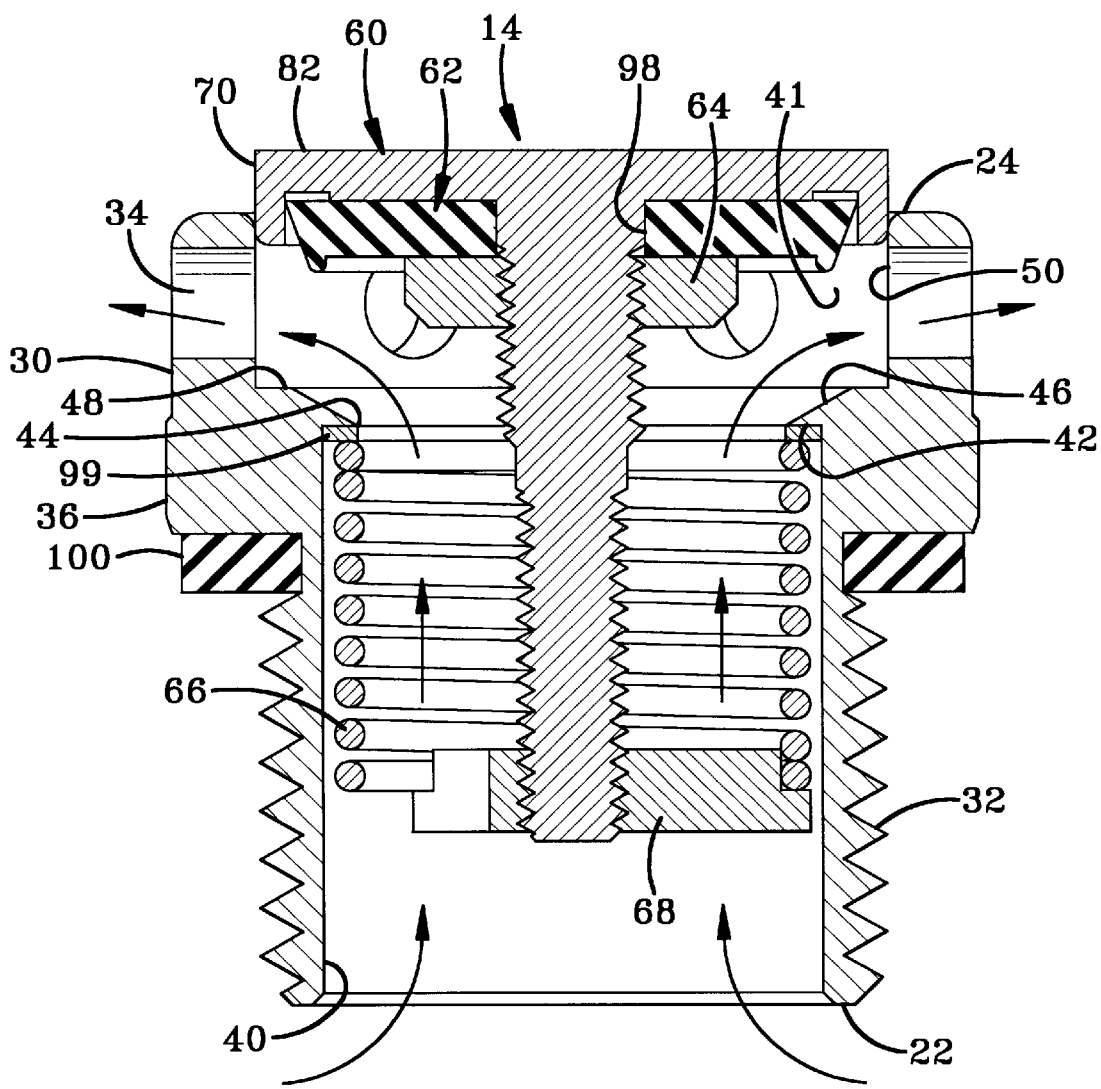
FIG. 4 is a sectional view similar to FIG. 3 showing the super high flow pressure relief valve exhausting or relieving excess fluid from within the inflation device when maximum pressurization has been exceeded.
Figure 6:
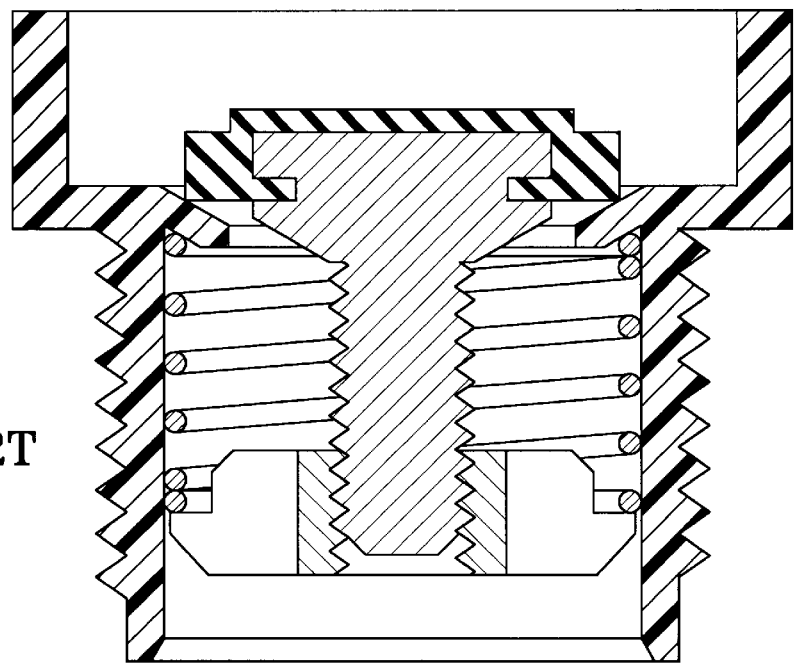
FIG. 6 is a sectional view of a first prior art pressure relief valve shown when maximum pressurization has not been exceeded.
Figure 7:
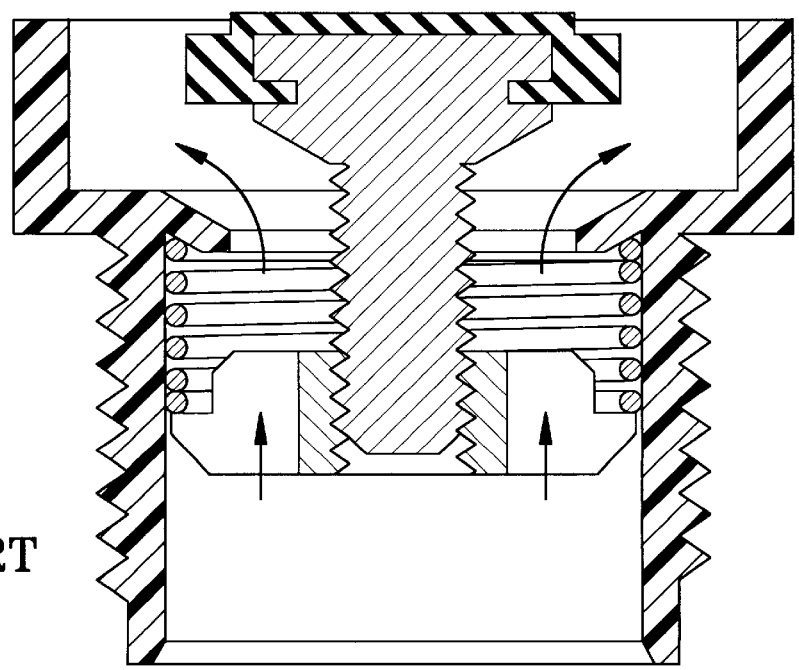
FIG. 7 is the same sectional view of the first prior art pressure relief valve of FIG. 6 shown exhausting excess fluid when maximum pressurization has been exceeded.
Figure 8:
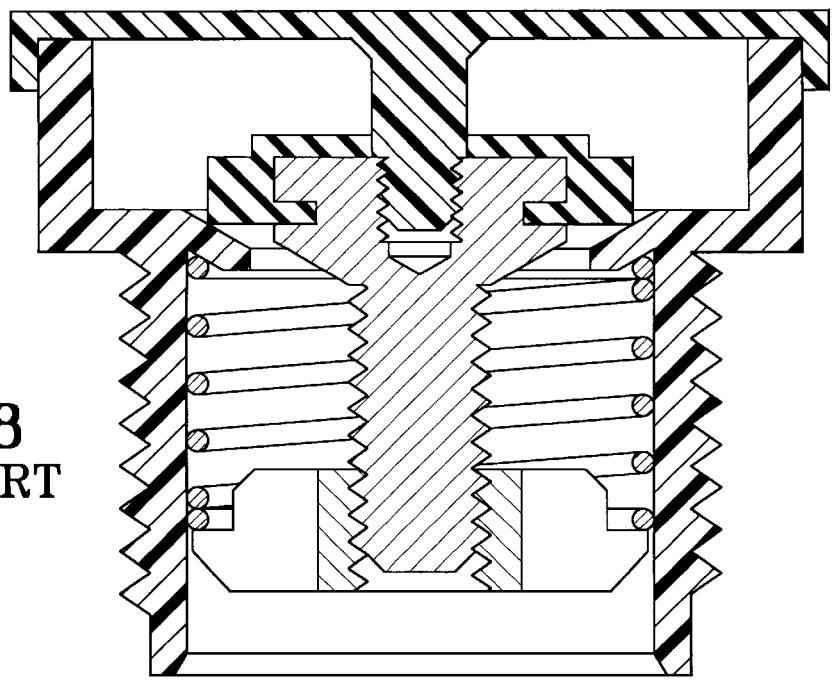
FIG. 8 is a sectional view of a second prior art pressure relief valve shown when maximum pressurization has not been exceeded.
Figure 9:
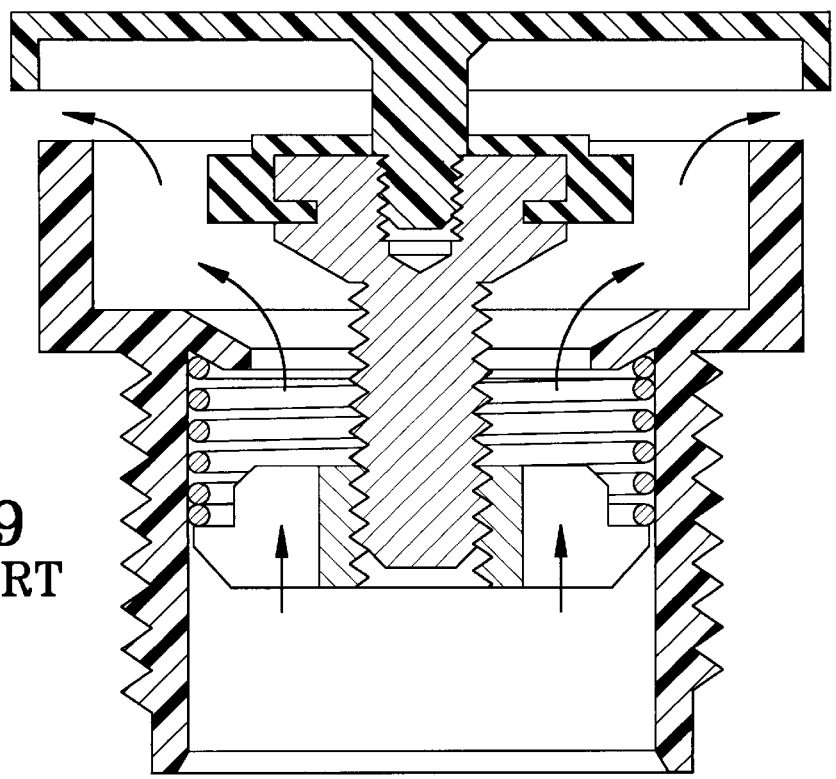
FIG. 9 is the same sectional view of the second prior art pressure relief valve of FIG. 8 shown exhausting excess fluid when maximum pressurization has been exceeded.

Pressure relief valve 10 as shown exploded in FIG. 2 includes a valve body 12 and a poppet assembly 14. When assembled, pressure relief valve 10 is affixed to the inflation device to maintain the inflated pressure therein below a preselected maximum, during both deployment (inflation) and use thereafter. Specifically, poppet assembly 14 engages and functions within valve body 12 and cooperates with valve body 12 to maintain the pressure within the inflation device below the preselected maximum pressure while retaining a given quantity of fluid content within the inflation device thereby assuring continued inflation thereof. If the preselected maximum pressure is exceeded, poppet assembly 14 releases the excess or surplus fluid content. The preselected maximum pressure and quantity of contained fluid are identified by the poppet assembly structure and size of the inflation device, respectively.

Valve body 12 is generally an elongated sleeve 20 with a first or bottom end 22 and a second or top end 24. A central passage or bore 26 is formed within valve body 12. Passage 26 extends between and has a common axis with circular bottom end 22 and circular top end 24 of sleeve 20.

Sleeve 20 includes a head or top 30 and a threaded neck 32 extending outwardly from head 30. Head 30 is of a larger outer diameter than the outer diameter of neck 32. Head 30 is formed with a plurality of exhaust ports 34 extending radially from passage 26 to the exterior of head 30. Head 30 also includes a polygonal shoulder or flange 36 at the intersection of the head with neck 32. Flange 36 may be engaged by a tool during rotational installation of valve 10.

Passage 26 includes a lower throat 40 and an upper mouth 41 formed by an annular wall 50 and separated from throat 40 by an inner annular lip 44. Lip 44 includes an annular shoulder 42 which communicates with throat 40, and a poppet shoulder having a tapered surface 46 and a stop 48, both of which communicate with mouth 41. Throat 40 extends from bottom end 22 to inner shoulder 42. Inner shoulder 42 extends from throat 40 radially inward toward the central axis. Shoulder 42 defines one side of lip 44 while tapered surface 46 defines the other. Tapered surface 46 extends outward from lip 44 in an oblique manner forming a continuous angled surface with stop 48. Stop 48 extends radially from tapered surface 46 to annular wall 50. Annular wall 50 extends from stop 48 to top end 24 in an annularly equivalent manner to throat 40 except with a larger diameter. The plurality of radial holes 34 are formed within annular wall 50 and preferentially are of identical diameters, of equal spacing apart, and all within the same radial plane.

Poppet assembly 14 includes a poppet 60, a seal 62, a seal retainer 64, a spring 66, and a spring retainer 68. Poppet 60 includes a generally planar and circular base 70 having an inner face 74 and an outwardly extending peripheral skirt or lip 76. A slightly raised disk-like extension 80 is formed centrally on inner face 74 and defines a seal receiving groove 78 with skirt 76. A flat outer face 82 is formed on base 70, opposite inner face 74. A shaft 72 extends outward from a center point of inner face 74, and more particularly, from disk-like extension 80. Shaft 72 is preferably threaded and of a larger diameter along a proximate portion 84 in relation to base 72 and of a smaller diameter along a distal portion 86.

Seal 62 is any sealing member such as an O-ring that will sufficiently seal poppet 60 against tapered surface 46 of lip 44. In the preferred embodiment, seal 62 has a particular configuration that is most desirable and includes a flat back surface 90, a tapered outer surface 92, and a flat front surface 96 that is substantially parallel to back surface 90. Side surface 92 is of similar taper to surface 46 and terminates in an annular lip 94 that extends outward from front surface 96. A circular hole 98 is formed centrally in seal 62.

Although seal retainer 64 may be any of various kinds of nuts or equivalent connectors, in the preferred embodiment seal retainer 64 is circular shaped and has at least one surface complimentary in shape to flat front surface 96 of seal 62. Seal retainer 64 is threadable upon proximate portion 84 to hold seal 62 against inner face 74.

Spring 66 is any biasing mechanism capable of biasing poppet 60 tightly against tapered surface 46. Preferably, spring 66 is a helical coil spring inserted within throat 40 against inner shoulder 42. A supplemental washer 99 may be sandwiched between spring 66 and shoulder 42.

Figure 5:
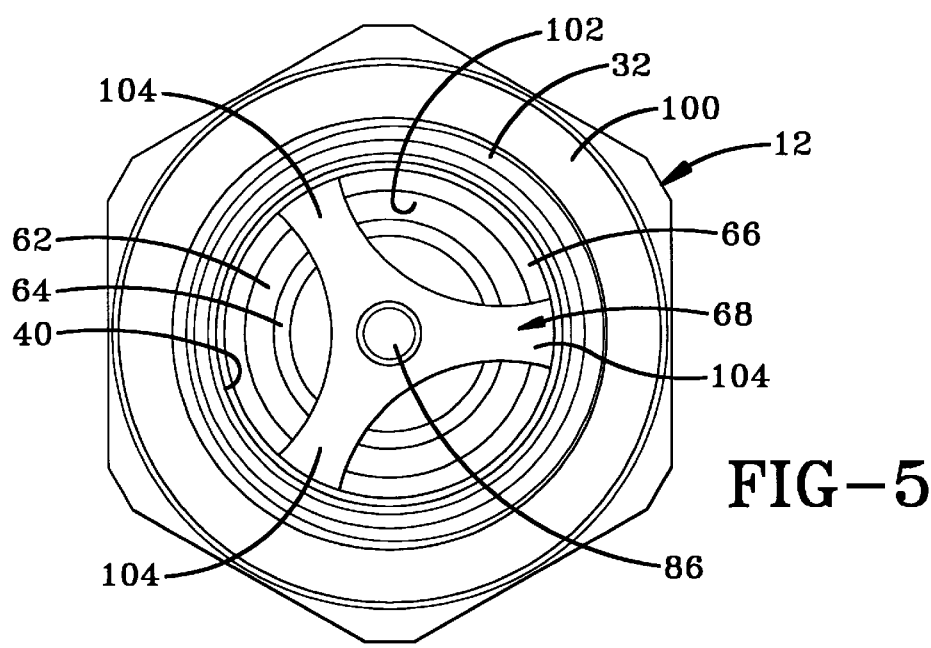
FIG. 5 is a bottom view of the super high flow pressure relief valve of FIG. 1 taken along line 5—5 in FIG. 1.

Spring retainer 68 is any mechanism capable of compressing one end of spring 66 against supplemental washer 99 and shoulder 42 while retaining the other end of spring 66 within bottom end 22 of sleeve 20. Spring retainer 68 must also form several openings 102 (FIG. 5) within bottom end 22 of sleeve 20 to allow a quantity of the fluid content within the inflation device to pass therethrough, as described below in further detail. In the preferred embodiment, spring retainer 68 includes a plurality of integrally formed outwardly extending arms 104. Each arm 104 includes a notch 106 formed on the outer free end thereof which engages the other end of spring 66. A threaded hole 108 is formed centrally in spring retainer 68 for engaging distal portion 86 of stem 72. The receiving of distal portion 86 by retainer 68 assists in the biasing of spring 66. Spring 66 pulls poppet 60 toward retainer 68 as biased spring 66 acts against shoulder 42 to close PRV 10.

As assembled, seal 62 via center hole 98 is slid over shaft 72 until the seal abuts inner face 74. Specifically, seal 62 sits against extension 80 and covers seal receiving groove 78. Skirt 76 of poppet 60 extends above and covers substantially all of seal 62 when radially viewed. Seal 62 is positioned such that tapered outer surface 92 and annular lip 94 extend outward from poppet 60. Seal 62 is then secured to inner face 74 by threading seal retainer 64, and specifically proximate portion 84, onto shaft 72 until tight.

Poppet 60 is then inserted shaft first into mouth 41 and passage 26 from the top end 24 until lip 94 of seal 62 seats against tapered surface 46. Washer 99 is slid into bottom end 22 until it rests adjacent annular shoulder 42. Spring 66 is inserted into passage 26 from bottom end 22 until spring 66 seats against washer 99. Spring retainer 68 is then snapped onto the outermost end of spring 66. Spring 66 is compressed inward until shaft 72 aligns with hole 108 of spring retainer 68 and is threaded therein. The poppet is now biased and ready for connection to an inflatable device typically with a seal 100 positioned therebetween. Poppet base 70 is positioned between bottom end 22 which is within an inflatable device (not shown) and exhaust vents 34 and prohibits fluid exhaust through PRV 10. More particularly, the outer surface of skirt 76 is positioned adjacent annular wall 50 to block vents 34. In operation, should the pressure within the inflation device exceed the spring strength, the fluid pressure force against inner face 74 of poppet 60 will push the poppet outward toward top end 24 thereby moving skirt 76 across and beyond vents 34 exhausting or releasing the fluid pressure through the vents.

In accordance with the invention, the skirt 76 defines a rigid barrier surface that is not effected by the fluid pressure and therefore prevents fluid passage into vents 34 until the skirt has at least partially passed the vents. This rigid barrier surface in skirt 76 forces the internal fluid pressure to open the poppet further prior to exhausting which increases the fluid exhaust rate, particularly in more desirable pressure ranges, when compared to otherwise identical valves having the same configurations including the same throat size, same number of vents and vent size, same vent positioning, same spring conditions, and same fluid pressurization within the inflatable device.

Figure 10:
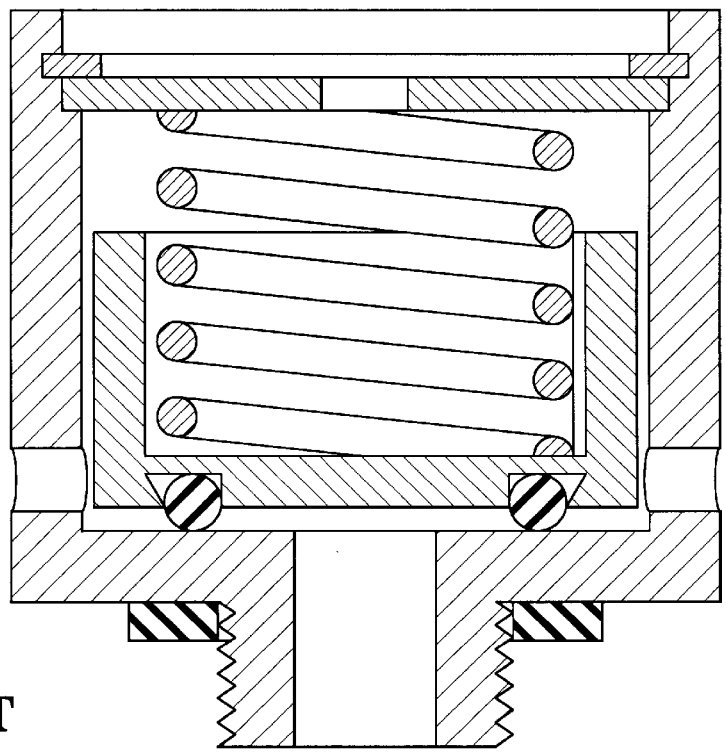
FIG. 10 is a sectional view of a third prior art pressure relief valve shown when maximum pressurization has not been exceeded.
Figure 11:
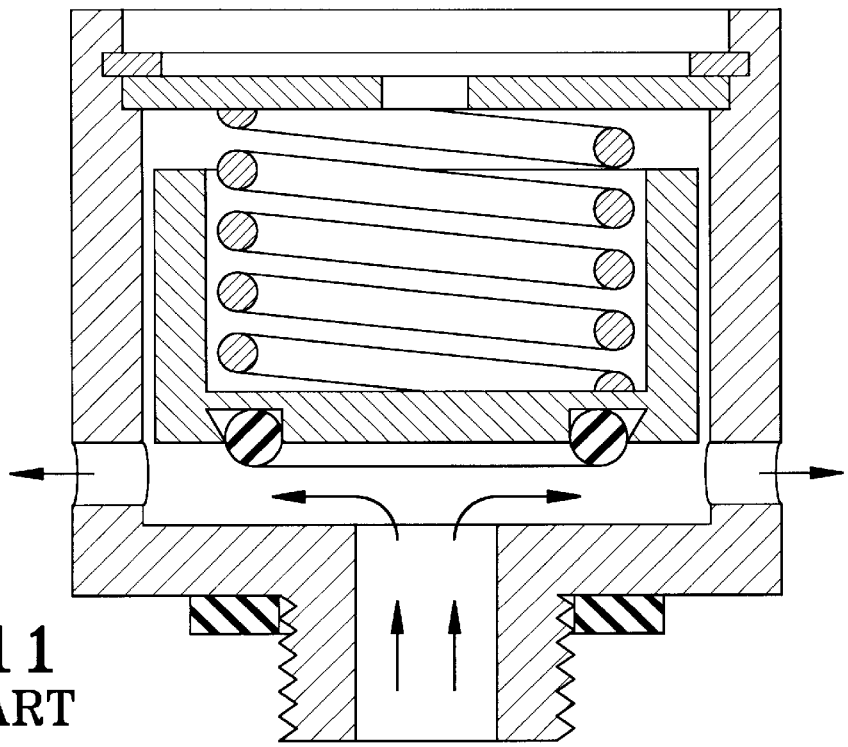
FIG. 11 is the same sectional view of the third prior art pressure relief valve of FIG. 10 shown exhausting excess fluid when maximum pressurization has been exceeded.

Specifically, tests were conducted to compare exhaust flows between the present invention A which is pressure relief valve 10 with the skirt, a prior art internal poppet PRV B such as that shown in FIGS. 10-11, and a Mirada™ Super High Flow PRV C of the double row, lazy Z pattern. The results were significant in that PRV B was capable of less than 12 cfm at 3.0 psi and less than 40 cfm at 3.5 psi while PRV A supplied 20 cfm at only 2.5 psi. The significance is that super high flow exhaust is achieved in the preferred or more desirable pressure ranges of approximately 2.0 to 2.5 psi, rather than at 3.0 psi and beyond.

These results are further significant in that PRV A opens at or around 2.0 psi (see FIG. 12) thereby supplying low flow (up to 10 cfm) at between 2.0 and 2.1 psi and medium flow (up to 20 cfm) at 2.10 to 2.50 psi. In contrast, PRVs B and C do not provide any flow until 2.1 and 2.5 psi, respectively, and do not provide even medium flow until approximately 2.4/2.5 and 3.1/3.3 psi, respectively. PRV A clearly provides industry desirable flow rates at industry preferred pressure ranges in contrast to the prior art.

These results are also significant as to high flow capabilities. PRV A provides high flow at between approximately 3.0 and 3.5 psi. This allows flow at high rates without elevating pressures to undesirable levels of 3.5 to 4.5 or more psi. As is readily apparent from PRV B, prior art PRVs do not achieve high flow characteristics until undesirable levels of pressure have been achieved, that is, pressures exceeding 3.5 psi.

PRV A therefore provides highly desirable early opening (at lower pressure) at low and medium flows coupled with very high flows at moderate pressures rather than high, undesirable pressures per industry standards and desires.

In further accordance with the invention, the skirt has allowed a reduction in the number of vents 34 within the valve 10 with increased flow rates in the most desirable pressure ranges of under 2.5 psi and with nominal difference thereabove. This is shown by comparing PRV A with PRV C on FIG. 12. Specifically, the standard number of vent holes has always been eight, with the exception of the Mirada™ Super High Flow PRV with the unique double row and "lazy Z" or zig-zag pattern which included double the vents, that is sixteen, at approximately half the diameter.

It has further been found that a reduction in the number of vent holes to less than eight (8), such as six (6), does not result in a significant reduction in performance. That is, PRV A can be designed and operated with only six holes (of the same size as the eight hole embodiment), while still achieving low or medium flows at low pressure (approximately 2.0 psi) as well as high flows at moderate pressure (under 3.0 or 3.5 psi).

Accordingly, the improved pressure relief valve is simplified, provides an effective, safe, inexpensive, and efficient device which achieves all the enumerated objectives, provides for eliminating difficulties encountered with prior devices, and solves problems and obtains new results in the art.

Some of the objectives achieved include:
(1) Significantly increased exhaust rates in preferred lower operating pressure ranges.
(2) Significant reduction in number of vent holes versus lazy Z format.
(3) Significant reduction in valve production cost, particularly in the vent or port drilling and deburring area.
(4) Maintains compactness, particularly in the area of height.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved pressure relief valve is constructed and used, the characteristics of the construction, and the advantageous, new and useful results obtained; the new and useful structures, devices, elements, arrangements, parts and combinations, are set forth in the appended claims.

We claim:

1. A pressure relief valve for use in exhausting overpressure in an inflatable device comprising:

a valve body having an open end with a passage extending inward therefrom, the passage including a poppet shoulder therein defining a smaller diameter section of the passage from the open end to the poppet shoulder and a larger diameter section thereafter, and the valve body further including a plurality of exhaust ports radially extending from the larger diameter section;

a poppet having a base including an inner surface with a threaded shaft extending therefrom, the inner surface further including a skirt extending perpendicularly outward from the outer periphery of the inner surface whereby the skirt partially covers the plurality of exhaust ports when the poppet seats against the poppet shoulder to provide a rigid barrier that prevents significant fluid leakage into the ports until after the skirt uncovers the ports thereby further opening the port and allowing for increased fluid exhaust rates;

a poppet seal seated against the inner surface and extending radially from the shaft to the inside of the skirt; and a biasing source between the inner surface of the poppet and the open end for biasing the poppet seal against the poppet shoulder.

2. The pressure relief valve as set forth in claim 1 wherein the poppet shoulder extends radially into the passage so as to define a spring shoulder for supporting the biasing source.

3. The pressure relief valve as set forth in claim 2 wherein the biasing source is compressibly positioned against the spring shoulder by a retainer.

4. The pressure relief valve as set forth in claim 3 wherein the biasing source is a spring compressibly positioned within the smaller diameter section.

5. The pressure relief valve as set forth in claim 2 wherein the poppet shoulder is tapered.

6. The pressure relief valve as set forth in claim 1 wherein the diameter of the poppet and poppet seal are greater than the diameter of the smaller diameter section, and lesser in diameter than the diameter of the skirt.

7. The pressure relieve valve as set forth in claim 1 wherein the skirt selectively covers the plurality of exhaust ports.

8. The pressure relief valve as set forth in claim 1 wherein the inner diameter of the smaller diameter section is between approximately one-half of an inch and two inches, and the inner diameter of the larger diameter section is greater than the inner diameter of the smaller diameter section and between approximately one-half of an inch and two inches.

9. The pressure relief valve as set forth in claim 8 wherein the inner diameter of the poppet shoulder is less than both the inner diameter of the smaller diameter section and the inner diameter of the larger diameter section.

10. The pressure relief valve as set forth in claim 9 wherein the inner diameter of the poppet shoulder is between approximately one-half inch and one inch.

11. The pressure relief valve as set forth in claim 10 wherein the inner diameter of the smaller diameter section is approximately seven-eighths of an inch, the inner diameter of the larger diameter section is approximately one and one-eighth inch, and the inner diameter of the poppet shoulder is between approximately five-eighths and three-quarters of an inch.

12. The pressure relief valve as set forth in claim 11 wherein each exhaust port is between one-eighth and one-quarter of an inch in diameter.

13. The pressure relief valve as set forth in claim 12 wherein the base is of substantially the same diameter as the inner diameter of the larger diameter section.

14. The pressure relief valve as set forth in claim 13 wherein the plurality of exhaust ports is eight or less.

15. The pressure relief valve as set forth in claim 14 wherein flow through the smaller diameter section to the exhaust ports of greater than 5 cfm occurs prior to a pressure of 2.5 psi being exerted against the poppet.

16. The pressure relief valve as set forth in claim 14 wherein flow through the smaller diameter section to the exhaust ports of greater than 20 cfm occurs prior to a pressure of 3.0 psi being exerted against the poppet.

17. The pressure relief valve as set forth in claim 16 wherein flow through the smaller diameter section to the exhaust ports of greater than 35 cfm occurs prior to a pressure of 3.0 psi being exerted against the poppet.

18. The pressure relief valve as set forth in claim 14 wherein flow through the smaller diameter section to the exhaust ports of greater than 40 cfm occurs prior to a pressure of 3.5 psi being exerted against the poppet.

19. The pressure relief valve as set forth in claim 18 wherein flow through the smaller diameter section to the exhaust ports of greater than 55 cfm occurs prior to a pressure of 3.5 psi being exerted against the poppet.

20. The pressure relief valve as set forth in claim 14 wherein pressure exerted against the poppet never exceeds 2.5 psi to achieve flow rates of as much as 20 cfm.

21. The pressure relief valve as set forth in claim 14 wherein pressure exerted against the poppet never exceeds 3.0 psi to achieve flow rates of as much as 35 cfm.

22. The pressure relief valve as set forth in claim 14 wherein pressure exerted against the poppet never exceeds 3.5 psi to achieve flow rates of as much as 55 cfm.

23. A pressure relief valve for use in exhausting over-pressure in an inflatable device comprising:

a valve body having an open end with a passage extending inward therefrom, the valve body including a plurality of exhaust ports radially extending from the passage; and a poppet having an inner surface with a threaded shaft extending therefrom and into a portion of the passage between the open end and exhaust port, the inner surface having an outer edge including a skirt extending therefrom whereby the poppet is biased to a position such that the skirt partially covers the exhaust ports and thus blocks fluid communication between the open end and the plurality of exhaust ports.

24. The pressure relief valve as set forth in claim 23 wherein the plurality of exhaust ports is eight or less.

25. The pressure relief valve as set forth in claim 23 wherein over-pressure exhausting occurs in excess of 15 cfm at below 2.5 psi.

26. The pressure relief valve as set forth in claim 23 wherein over-pressure exhausting occurs in excess of 30 cfm at below 3.0 psi.

27. The pressure relief valve as set forth in claim 23 wherein the skirt is biased to cover the plurality of exhaust ports.

28. The pressure relief valve as set forth in claim 23 wherein a poppet seal seats against the inner surface along an inside edge of the skirt.

29. The pressure relief valve as set forth in claim 23 wherein the skirt extends from the poppet an amount to almost radially cover a poppet seal seated against the inner surface along an inside edge of the skirt.

30. A pressure relief valve for use in exhausting over-pressure in an inflatable device comprising:

a valve body having an open end with a passage extending inward therefrom, the valve body including a plurality of exhaust ports radially extending from the passage, the valve body further including a poppet stop in between the open end and the plurality of exhaust ports;

a poppet seal;

a poppet having a base with a threaded shaft extending therefrom, the base including an inner surface with an outer edge including a skirt extending therefrom whereby the poppet seal seats against the inner surface inside of the skirt and the skirt partially covers the plurality of exhaust ports when the poppet is seated against the poppet stop; and a biasing source for biasing the poppet against the poppet stop.

31. The pressure relief valve as set forth in claim 30 wherein the poppet further includes a groove within the inner surface inside of the skirt in which the poppet seal seats.

32. The pressure relief valve as set forth in claim 31 wherein the spring is compressed against the shoulder by a spring retainer positioned within the open end.

33. The pressure relief valve as set forth in claim 30 wherein the biasing source is a spring compressed against a shoulder within the valve body between the open end and the plurality of exhaust ports.

34. The pressure relief valve as set forth in claim 30 wherein a seal retainer holds the poppet seal against the inner surface.

35. The pressure relief valve as set forth in claim 30 wherein the plurality of exhaust ports is eight.

36. The pressure relief valve as set forth in claim 30 wherein the plurality of exhaust ports is six.

37. The pressure relief valve as set forth in claim 30 wherein the skirt is biased to cover the plurality of exhaust ports.

38. The pressure relief valve as set forth in claim 30 wherein the skirt extends from the poppet an amount to almost radially cover the poppet seal seated against the inner surface inside of the skirt.

* * * * *